(12) United States Patent
Hosokawa et al.

(10) Patent No.: US 7,852,715 B2
(45) Date of Patent: Dec. 14, 2010

(54) OPTICAL DISC APPARATUS AND OPTICAL DISC DETERMINING METHOD

(75) Inventors: Kouji Hosokawa, Ehime (JP); Kei Ikeda, Ehime (JP); Kohei Ashiho, Ehime (JP)

(73) Assignee: Panasonic Corporation, Osaka (JP)

( * ) Notice: Subject to any disclaimer, the term of this patent is extended or adjusted under 35 U.S.C. 154(b) by 567 days.

(21) Appl. No.: 11/911,504

(22) PCT Filed: Feb. 6, 2007

(86) PCT No.: PCT/JP2007/051978
§ 371 (c)(1),
(2), (4) Date: Oct. 12, 2007

(87) PCT Pub. No.: WO2007/099740
PCT Pub. Date: Sep. 7, 2007

(65) Prior Publication Data
US 2009/0034399 A1 Feb. 5, 2009

(30) Foreign Application Priority Data
Feb. 28, 2006 (JP) .............................. 2006-051407
Apr. 7, 2006 (JP) .............................. 2006-105757

(51) Int. Cl.
*G11B 7/00* (2006.01)
(52) U.S. Cl. .............. 369/44.27; 369/44.25; 369/44.26; 369/53.23; 369/53.28; 369/53.37; 369/94
(58) Field of Classification Search .............. 369/44.25, 369/44.26, 44.27, 53.23, 53.28, 53.37, 94
See application file for complete search history.

(56) References Cited

U.S. PATENT DOCUMENTS

| 5,963,524 A | * | 10/1999 | Tokiwa et al. | 369/53.23 |
| 5,966,357 A | * | 10/1999 | Ryoo | 369/53.23 |
| 6,058,082 A | * | 5/2000 | Hwang | 369/44.27 |
| 6,327,234 B1 | * | 12/2001 | Kamiyama et al. | 369/53.23 |
| 6,449,232 B1 | * | 9/2002 | Kuwahara et al. | 369/53.23 |
| 6,487,153 B2 | * | 11/2002 | Kamiyama et al. | 369/53.23 |
| 6,608,805 B2 | * | 8/2003 | Ueki | 369/53.23 |
| 7,233,556 B2 | * | 6/2007 | Sun | 369/53.23 |
| 7,327,642 B2 | * | 2/2008 | Yamada et al. | 369/44.29 |
| 2002/0031072 A1 | * | 3/2002 | Kamiyama et al. | 369/53.23 |
| 2002/0114231 A1 | | 8/2002 | Shirakawa et al. | |
| 2003/0231567 A1 | * | 12/2003 | Moritomo | 369/53.21 |

(Continued)

FOREIGN PATENT DOCUMENTS

JP 2002245639 8/2002

(Continued)

OTHER PUBLICATIONS

PCT International Search Report dated May 22, 2007.

*Primary Examiner*—Wayne R Young
*Assistant Examiner*—Brenda Bernardi
(74) *Attorney, Agent, or Firm*—Dickinson Wright PLLC

(57) ABSTRACT

An objective lens is moved with a disc irradiated with laser light. A maximum value FEmax and a minimum value FEmin of the focus error signal, and a maximum value FSmax of the amplitude of a focus sum signal are measured. "(FEmax−FEmin)/FSmax" is compared with a determination value to determine the type of a disc.

2 Claims, 9 Drawing Sheets

U.S. PATENT DOCUMENTS

2005/0152252 A1 7/2005 Horimoto
2005/0276199 A1* 12/2005 Sugai .................. 369/53.22
2006/0181972 A1 8/2006 Yak et al.

FOREIGN PATENT DOCUMENTS

WO 03063149 7/2003
WO 2004088656 10/2004

* cited by examiner

| SUBSTRATE THICKNESS (mm) | 1.5 | 1.2(CD) | 0.9 (Dual Disc) | 0.6(DVD) | 0.3 | 0(≒BD) |
|---|---|---|---|---|---|---|
| FE BALANCE VALUE BASED ON FORMULA 3 (%) | −41.5166 | −0.6817 | 22.35674 | 30.41246 | 36.06871 | 42.18632 |
| FE BALANCE VALUE BASED ON FORMULA 1 (PRIOR ART) (%) | −35.371 | −0.312 | 18.31 | 23.47 | 26.27 | 28.28 |

OPTICAL DISC APPARATUS AND OPTICAL DISC DETERMINING METHOD

TECHNICAL FIELD

The present invention relates to an optical disc apparatus that can perform recording or reproduction of discs with different substrate thicknesses.

BACKGROUND ART

Various types of discs such as a CD (Compact Disc), a DVD (Digital Versatile Disc), and a Blu-ray disc can be set in an optical disc apparatus for recording or reproduction. In recent years, dual discs have also been commercially available which have a non-DVD surface, that is, a music-only surface, and a DVD surface laminated on the disc opposite the non-DVD surface so that reflection layers in the non-DVD and DVD surfaces function in opposite directions; digital audio information is recorded on the non-DVD surface, and video information or the like is recorded on the DVD surface on the basis of DVD standards.

Physical standards for CDs limit a maximum tolerance value for a substrate thickness to 1.5 mm. Accordingly, For dual discs, to minimize the thickness of the disc, the DVD surface has a substrate thickness of 0.6 mm, which is the same as that of normal CDs, but the non-DVD surface has a substrate thickness of about 0.9 mm, which is smaller than that of the normal CDs, 1.2 mm. However, since the only difference between the dual disc and the normal CD is the substrate thickness, the non-DVD surface of the dual disc is determined to be a CD in optical disc determination.

To allow a single optical pickup to optically access these discs with the different substrate thicknesses for recording or reproduction, it is necessary to automatically determine what type of disc has been set in the apparatus. The type of the disc is conventionally determined on the basis of a focus balance value (symmetry) obtained by normalizing the deviation of the S-shaped signal symmetry of a focus error signal FE resulting from spherical aberration, on the basis of the amplitude of the focus error signal FE. According to WO 2003/063149 and Japanese Patent Laid-Open No. 2002-245639, the focus balance value is obtained by:

$$(FEmax+FEmin)/(FEmax-FEmin) \quad \text{Formula 1},$$

and then compared with a reference value to determine the type of the disc. However, FEmax and FEmin in the above formula are values relative to the reference level of the focus error signal FE. Formula 1 can thus be rewritten as:

$$(FEmax-FEmin)/(FEmax+FEmin) \quad \text{Formula 2}$$

The present invention handles FEmax and FEmin in absolute values. Thus, Formula 2 is used for comparison with the present invention. However, in absolute values, FEmin always has a negative value, so that the results of the formulae are almost the same.

Specifically, an optical disc apparatus of this type is configured as shown in FIG. 8.

An optical pickup 1 can apply recording signals to and obtain reproduction signals from, different types of discs 2, for example, a CD and a DVD. The optical pickup 1 has a semiconductor laser 3, a condensing lens 4, an objective lens 5, a polarizing hologram 6, a tracking detecting light receiving unit 7, and a focus detecting light receiving unit 8. The semiconductor laser 3 is controlled by a laser control unit 9 to emit laser light of appropriate power. To avoid focus errors and tracking errors, the objective lens 5 can be moved in a focus direction and a disc diameter direction, respectively, in response to driving signals from an actuator driving unit 10. The condensing lens 4 converts laser light emitted by the semiconductor laser 3 into parallel light. The light having passed through the condensing lens 4 forms an optical spot on the disc 2 through the objective lens 5.

Reflected light from the disc 2 passes through the objective lens 5 and the condensing lens 4 and is diffracted into reflected light for focus detection and reflected light for tracking detection by the polarizing hologram 6. The reflected light for focus detection is detected by the focus detecting light receiving unit 8.

An FE signal measuring unit 11 measures a maximum value FEmax 12 and a minimum value FEmin 13 of the focus error signal output by the focus detecting light receiving unit 8, in the form of voltage or current values, or the like.

A disc determining unit 14 can determine the type of the disc on the basis of a difference in the waveform of an S-shaped signal using, as a reference, a focus error signal obtained at a position where the laser light can be focused. Here, the type of the disc is determined in accordance with Formula 1 on the basis of the maximum value FEmax and minimum value FEmin of the amplitude of the focus error signal measured by the FE signal measuring unit 11.

A control unit 15 controls the actuator driving unit 10, the disc determining unit 14, and the laser control unit 9.

FIG. 9 is a flowchart for optical disc determination made by the optical disc apparatus shown in FIG. 8.

In step S1, the disc 2 is irradiated with laser light. In step S2, the objective lens 5 in the optical pickup 1 is driven in the focus direction. While the objective lens 5 is driven, the FE signal is measured in step S3, the maximum value of the FE signal is stored in FEmax in step S4, and the minimum value of the FE signal is stored in FEmin in step S5.

In step S6, the difference between the absolute value of FEmax and the absolute value of FEmin is compared with a predefined determination value.

In step S6, if the difference is greater than the predefined determination value, the apparatus determines in step S7 that the set disc 8 is a "CD". If the difference is smaller than the predefined determination value, the apparatus determines in step S8 that the set disc 8 is a "DVD".

DISCLOSURE OF THE INVENTION

With such a conventional optical disc apparatus, the reliability of the disc type determination may be degraded by a variation in reflectance caused by a flaw on a disc surface or dust attached to the disk surface. When the disc is rotated during detection, the side-runout of the disc may vary the distance between objective lens and the disc. This may further degrade the reliability of the disc type determination.

Moreover, the conventional optical disc apparatus determines the non-DVD surface of the dual disc to be a CD. Thus, spherical aberration may blur reflected light to degrade the quality of the signal. Consequently, the disc may not be activated depending on the level of the adverse effect of the spherical aberration. This may result in a variation in operation.

An object of the present invention is to provide an optical disc apparatus that can determine the type of a disc more reliably than in the prior art, as well as an optical disc determining method.

Another object of the present invention is to improve the reliability of the activating operation and reading performance by determining the non-DVD surface of the dual disc to exclusively perform servo control corrections on this disc.

According to one embodiment of the present invention, the present invention provides an optical disc apparatus that is configured to record and/or reproduce different types of discs, the optical disc apparatus comprising a substrate thickness detecting unit for detecting the thickness of a substrate on the basis of a focus error signal and a disk deter mining unit for determining the type of the disc by comparing a pre-held value with the substrate thickness obtained by the substrate thickness detecting unit.

According to one aspect of the present invention, the disc is discharged if the disc determining unit determines the disc to have a non-DVD surface of a dual disc.

According to another aspect of the present invention, the apparatus further comprises a disk type notifying unit for notifying an external apparatus of the type of the disc, and when the disc determining unit determines the disc to have the non-DVD surface of the dual disc, the disc type notifying unit notifies the external apparatus that the non-DVD surface of the dual disk has been detected.

According to still another aspect of the present invention, the apparatus further comprises an optical pickup that irradiates the disc with laser light via an objective lens, a focus detecting light receiving unit for detecting a focus state on the basis of reflected light from the disc, and an FE signal measuring unit for measuring the amplitude of a focus error signal generated by the focus detecting light receiving unit, and when the disc determining unit determines the disc to have the non-DVD surface of the dual disc, an offset is applied to the focus error signal generated by the focus detecting light receiving unit.

According to yet another aspect of the present invention, the apparatus further comprises an optical pickup that irradiates the disc with laser light via an objective lens, an actuator that moves the objective lens in a focus direction, and a gain setting unit for setting a gain for the actuator, and when the disc determining unit determines the disc to have the non-DVD surface of the dual disc, an offset is applied to the gain setting unit.

According to another embodiment of the present invention, the present invention provides an optical disc apparatus that is configured for recording and/or reproduction of different types of discs, the optical disc apparatus comprising an optical pickup that irradiates the disc with laser light via an objective lens, an actuator that moves the objective lens in a focus direction, a focus detecting light receiving unit for detecting a focus state on the basis of reflected light from the disc, an FE signal measuring unit for measuring the amplitude of a focus error signal generated by the focus detecting light receiving unit, and a disc determining unit for determining the type of the disc on the basis of the amplitude measured by the FE signal measuring unit, wherein the actuator driving unit moves the objective lens closer to the disc, and before or after laser light is focused on a signal surface of the disc, the focus error signal is generated, and when a maximum value of the amplitude of the focus error signal is defined as FEmax, a minimum value of the amplitude of the focus error signal is defined as FEmin, and a maximum value of the amplitude of a focus sum signal is defined as FSmax, the disc determining unit determines the thickness of a substrate of the disc on the basis of (FEmax−FEmin)/FSmax.

According to one aspect of the present invention, the apparatus further comprises an automatic gain control amplifier that amplifies an input signal level to a target level, and the substrate thickness of the disc is determined by substituting, into the above formula, the maximum amplitude value FEmax and the minimum amplitude value FEmin of the focus error signal amplified via the automatic gain control amplifier set to provide a gain that allows the maximum amplitude value FSmax of the focus sum signal obtained from the optical pickup, to reach a target level.

According to another aspect of the present invention, the type of the disc is determined on the basis of (FEmax−FEmin)/FSmax.

According to another embodiment of the present invention, the present invention provides an optical disc determining method that determines the type of a disc by moving an objective lens while irradiating the disc with laser light, and during the movement of the objective lens with the disc irradiated with the laser light, measuring the amplitude of a focus error signal, and on the basis of the focus error signal, measuring the thickness of a substrate of the disc and comparing the thickness of a substrate of the disc with a determination value to determine whether the disc has a non-DVD surface of a dual disc.

According to still another embodiment of the present invention, the present invention provides an optical disc determining method that determines the type of a disc by moving an objective lens while irradiating the disc with laser light, and during the movement of the objective lens with the disc irradiated with the laser light, measuring the amplitude of a focus error signal, a maximum value FEmax and a minimum value FEmin of the focus error signal, and a maximum value FSmax of the amplitude of a focus sum signal, and comparing "(FEmax−FEmin)/FSmax" with a determination value to determine the type of the disc.

This configuration performs normalization on the basis of FSmax, enabling the type of a set disc to be determined more accurately than in the prior art.

Moreover, whether or not the disc has a non-DVD surface of a dual disc is determined, and servo control corrections are exclusively performed on that disc. This makes it possible to improve the reliability of the activating operation and reading performance for the non-DVD surface of the dual disc.

BEST MODE FOR CARRYING OUT THE INVENTION

Embodiments of the present invention will be described below with reference to the drawings.

Embodiment 1

FIGS. 1 to 4 show (Embodiment 1) of the present invention.

Figure 1:
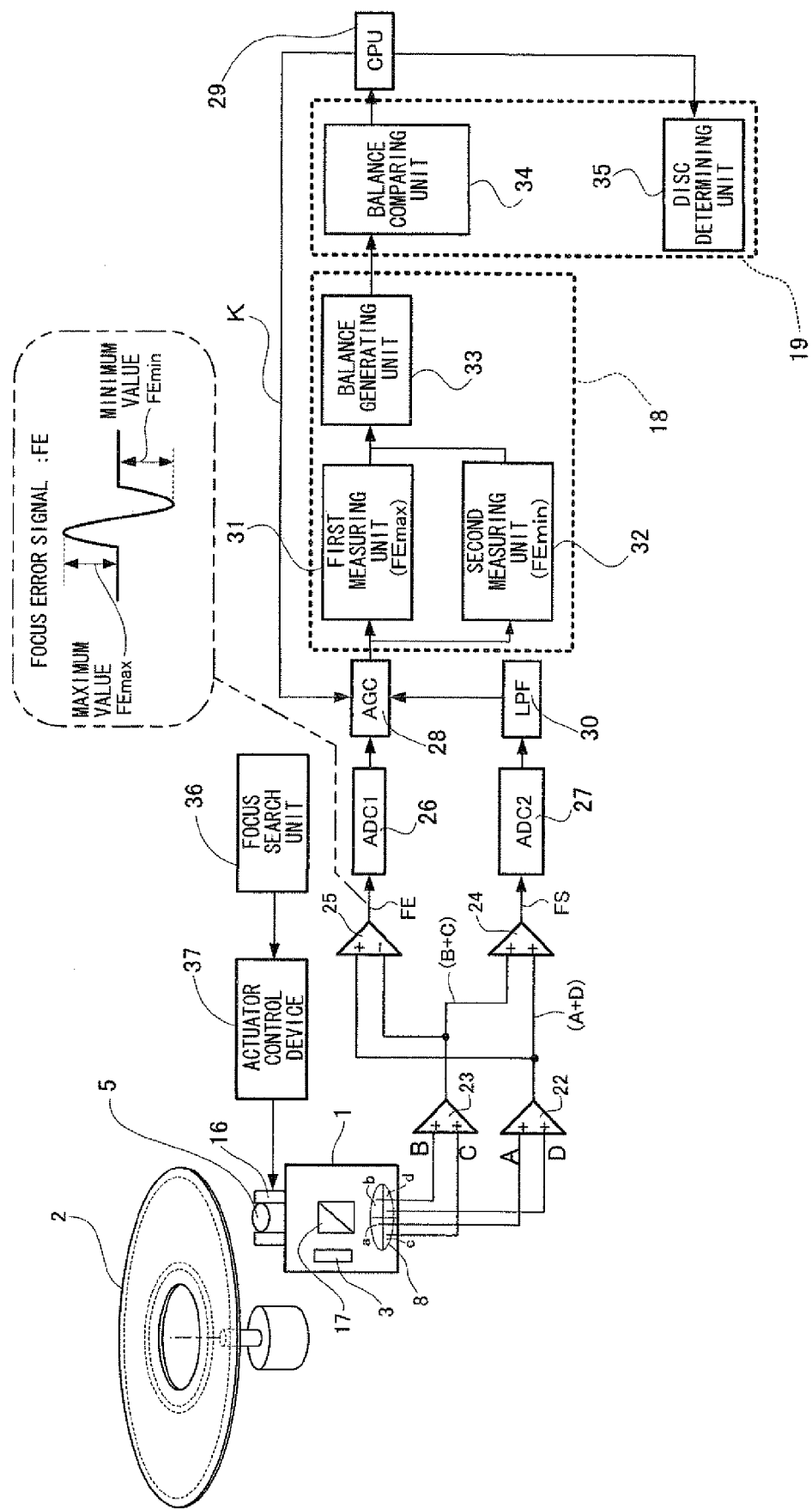
FIG. 1 is a diagram of the configuration of an optical disk apparatus in accordance with (Embodiment 1) of the present invention.

FIG. 1 shows the configuration of that part of an optical disc apparatus capable of recording or reproduction of different types of discs which relates to the determination of a non-DVD surface of a dual disc.

An optical pickup 1 that emits laser light to a disc 2 has an objective lens 5, a light source 3 that emits the laser light, an actuator 16 that moves the objective lens 5 in a focus direction, and a focus detecting light receiving unit 8 for detecting a focus state on the basis of reflected light from the disc 2. Reference numeral 17 denotes a dichroic prism that reflects the laser light emitted by the light source 3, toward the objective lens 5 so that the light emitted by the light source 3 is reflected toward the objective lens 5 and so that the light reflected by the disc 2 falls on the dichroic prism 17 via the objective lens 5 and passes through the dichroic prism 17 toward the focus detecting light receiving unit 8.

Reference numeral 18 denotes an FE signal measuring unit for measuring the amplitude of a focus error signal generated by the focus detecting light receiving unit 8. Reference numeral 19 denotes a disc determining unit for determining the type of the disc 2 on the basis of the amplitude measured by the FE signal measuring unit 18.

Figure 2:
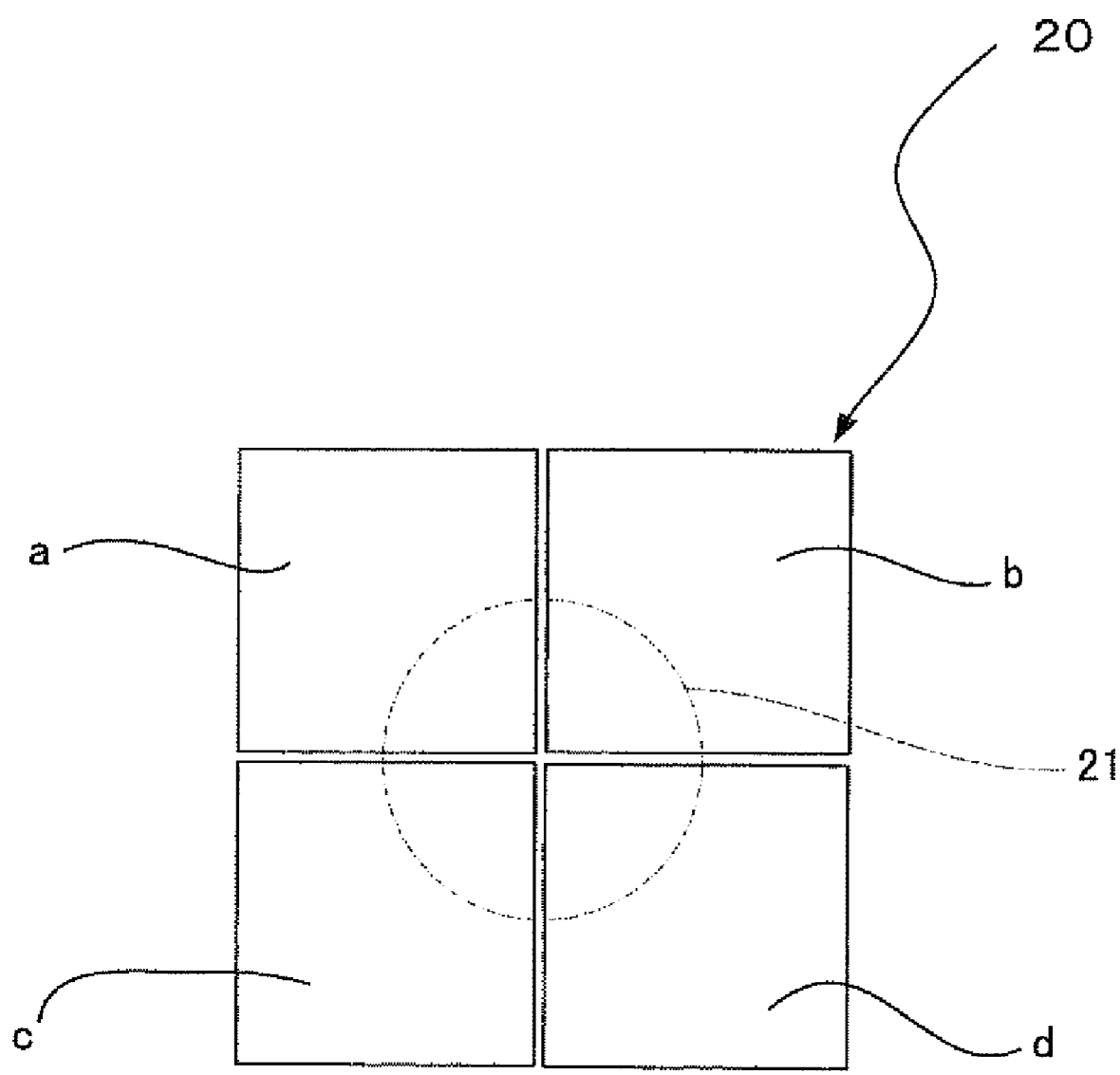
FIG. 2 is an enlarged plan view of a photodetector serving as a focus detecting light receiving unit in accordance with Embodiment 1.

Specifically, a photodetector 20 divided into four light receiving areas a, b, c, d as shown in FIG. 2 is used as the focus detecting light receiving unit 8. Reference numeral 21 denotes reflected light obtained when no focus error is present. The four-divided photodetector 20 is similar to that shown in FIG. 17 of Japanese Patent Laid-Open No. 2002-245639.

Detection signals A, D from the light receiving areas a, d are added together by a calculator 22 to obtain (A+D). Detection signals B, C from the light receiving areas b, c are added together by a calculator 23 to obtain (B+C), An output from the calculator 22, (A+D), and an output from the calculator 23, (B+C), are added together by a calculator 24 to obtain a focus sum signal FS, ((A+D)+(B+C)). The focus sum signal FS is a full addition signal and thus has a value increasing and decreasing consistently with the reflectance of the disc. Further, a calculator 25 subtracts the output (B+C) from the calculator 23 from the output (A+D) from the calculator 22 to obtain a focus error signal FE, ((A+D)−(B+C)). With a fixed substrate thickness, the amplitude of the focus error signal FE has a value increasing and decreasing consistently with the reflectance of the disc.

The focus error signal FE is converted into a digital signal via an analog/digital converter 26. The focus sum signal FS is converted into a digital signal via an analog/digital converter 27.

An output from the analog/digital converter 26 is input to the FE signal measuring unit 18 via an automatic gain control amplifier 28 that amplifies an input signal level to a target level. The gain of the automatic gain control amplifier 28 is set by a reference value "K" supplied by a computer 29 described below such that the maximum value of an output level reaches the target level when the automatic gain control amplifier 28 amplifies the focus sum signal FS. The focus sum signal FS is supplied to the input of the automatic gain control. amplifier 28 via a low pass filter 30.

The FE signal measuring unit 18 is composed of a first measuring unit 31 for detecting a maximum value FEmax of the amplitude in an output obtained while the automatic gain control amplifier 28 is amplifying the focus error signal FE, a second measuring unit 32 for detecting a minimum value FEmin of the amplitude, and a balance generating unit 33.

The balance generating unit 33 generates a focus balance value (FEmax−FEmin)/(FEmax+FEmin) on the basis of the ratio of the maximum value FEmax to the minimum value FEmin.

The disc determining unit 19 is composed of a balance comparing unit 34 and a disc determining unit 35. The balance comparing unit 34 calculates and outputs:

$$(FEmax-FEmin)/(FEmax+FEmin)*((FEmax+FEmin)/FSmax)=(FEmax-FEmin)/FSmax \quad \text{Formula 3.}$$

The disc determining unit 35 performs comparison with a reference value to identify the type of the disc. The computer 29, interposed between the balance comparing unit 34 and the disc determining unit 35 in the figure, controls the operation of each section shown in FIG. 1. The computer 29 further sets the gain of the automatic gain control amplifier 28 by performing control such that the maximum value FSmax of the output level reaches the predetermined target level when the automatic gain control amplifier 28 amplifies the focus sum signal FS.

Figure 3:
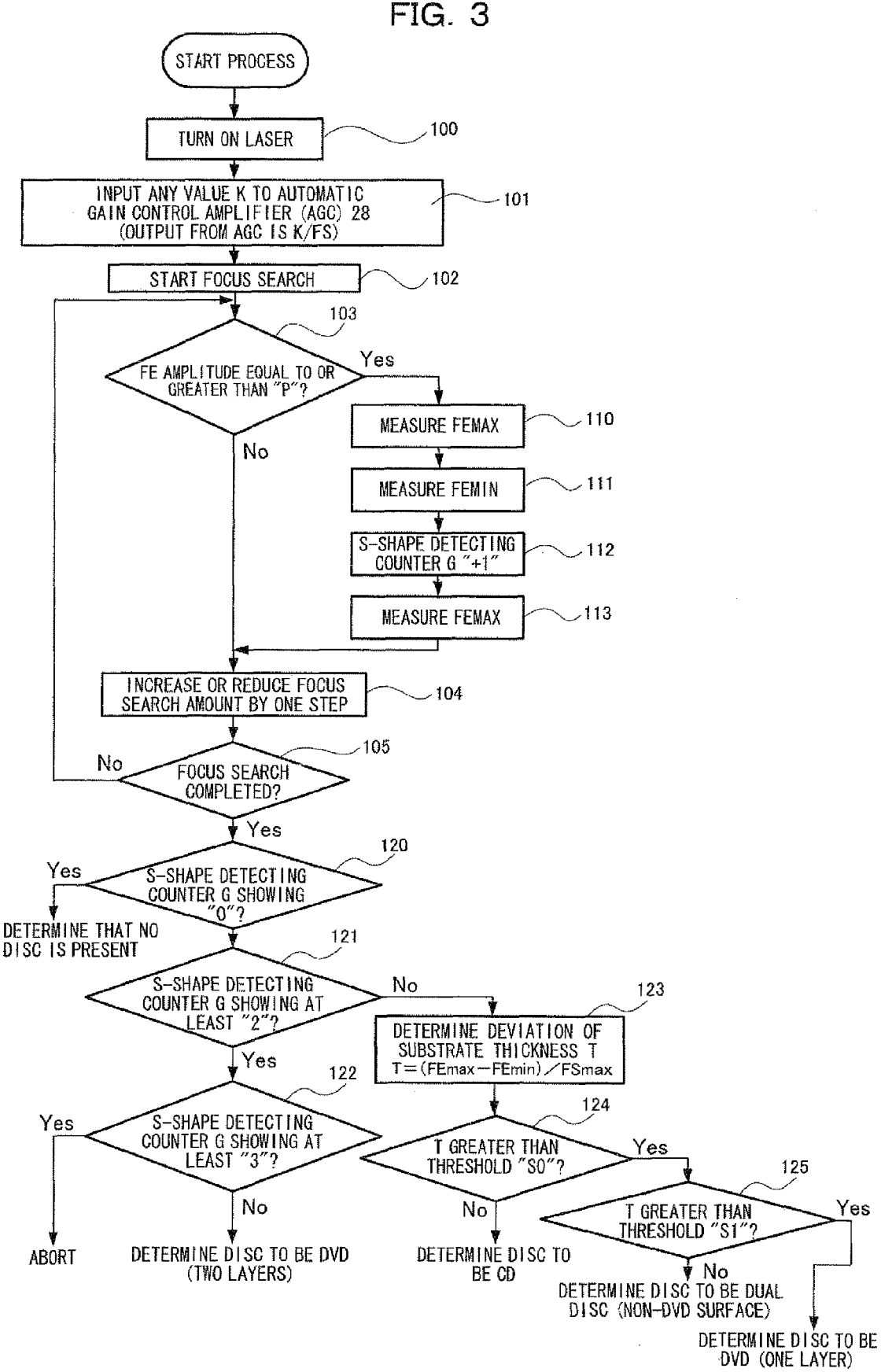
FIG. 3 is a flowchart of (Embodiment 1) of the present invention.

FIG. 3 is a flowchart of the optical disc determining method showing the configuration of the computer 29.

In step 100, a laser is turned on. Either a laser with a wavelength for CDs or a laser with a wavelength for DVDs may be used.

In step 101, the reference value "K" is input to the automatic gain control amplifier 28. As the value "K", a target value is set for the maximum amplitude value of the focus sum signal FS. Thus, even with a disc with a different reflectance, the amplitude of the focus error signal FE can be obtained which is equivalent to that obtained when the maximum amplitude value of the focus sum signal FS is "K". The automatic gain control amplifier 28 also has a function of amplifying an offset from focus balance when the substrate thickness of the disc varies; when the substrate thickness of the disc changes from the reference value, a peak point of the focus sum signal FS is offset from a zero cross point of the focus error signal FE.

In step 102, a focus search operation is started which involves moving the optical pickup up and down to measure the focus error signal FE.

In step 104 following step S103, the objective lens 5 is moved up or down step by step. The focus search operation is continued until the objective lens 5 is moved up or down to a predetermined value in step 105.

While steps 104 and 105 are being repeated, in step 103, the maximum value and minimum value of the focus error signal FE are monitored, and when the maximum or minimum value is at least a given value, the apparatus determines that the focus error signal FE has an S-shaped amplitude property.

If the focus error signal FE is determined to have the S-shaped amplitude property, FEmax is acquired in step 110 and FEmin is acquired in step 111. Further, in step 112, a counter G (also referred to as an S shape detection counter G) provided inside the computer 29 is set at "+1" to allow the counting of the number of times that the S shape has been detected.

In step 113, the maximum value FSmax of the focus sum signal FS is measured. In step 120, if the value in the S shape detection counter G is "0", the optical disc determination is that "no disc is set in the apparatus" because the desired S-shaped amplitude property of the focus error signal FE has not been obtained.

In step 121, if the S shape detection counter G shows "2" or more, the process shifts to step 122. If the S shape detection counter G shows "1", the process shifts to step 123.

In step 122, if the S shape detection counter G shows "2", the apparatus determines that the "disc is a DVD (two layers)". If the S shape detection counter G shows at least "3", the apparatus determines that the "disc determination indicates an error because of an unknown medium or the inappropriate setting of a threshold "P" for an S shape amplitude determination for the focus error signal FE".

First, in step 123, the substrate thickness is determined on the basis of the focus error signal FE in accordance with:

$$T=(FEmax-FEmin)/Fsmax$$

In step 124, the substrate thickness determined in step 123 is compared with a threshold "S0". If T is smaller than the threshold "S0", the apparatus determines that the "disc is a CD". If T is greater than the threshold "S0", the process shifts to step 125.

In step 125, the substrate thickness T determined in step 123 is compared with a threshold "S1". If T is smaller than the threshold "S1", the apparatus determines that the "disc has a non-DVD surface of a dual disc". If T is greater than the threshold "S1", the apparatus determines that the "disc is a DVD (one layer)".

Thus, the balance (symmetry) in the S-shaped signal of the focus error signal FE is determined using (FEmax−FEmin)/FSmax. If the balance is kept (if FEmax=1 and FEmin=1), the balance value is "0". If the substrate thickness is greater than the predetermined reference thickness, spherical aberration increases FEmax while reducing FEmin compared to the case where the substrate thickness is equal to the predetermined reference thickness in contrast, if the substrate thickness is smaller than the predetermined reference thickness, FEmax is increased, while FEmin is reduced. That is, the sign of the value (FEmax−FEmin) varies depending on the direction in which the substrate thickness deviates from the reference thickness. Thus, checking the sign of (FEmax−FEmin) makes it possible to detect whether the substrate thickness is greater or smaller than the reference thickness. The offset from the FE balance increases with the difference in value from "0". The reason why FSmax is used for normalization as in the case of (FEmax−FEmin)/FSmax is that an increase in the deviation of the substrate thickness from the predetermined reference thickness blurs reflected light from the reflection surface of a disc and reduces the amplitude of the focus error signal FE. Thus, an increase in the deviation of the substrate thickness from the predetermined reference thickness reduces the variation in the difference from the balance in the focus error signal FE. However, the maximum value of the focus sum signal FS decreases by the amount of light located outside the light receiving portion receiving the reflected light. Consequently, even with an increase in the difference of the substrate thickness from the predetermined reference thickness, the difference in the amplitude of the focus sum signal FS decreases at a given rate. Since the focus sum signal FS is almost the same as a signal for reflectance, the variation in the amplitude of the focus error signal FE, caused by the deviation of the substrate thickness from the predetermined reference thickness, does not match the variation in the focus sum signal FS. This disrupts the relationship in which the amplitude of the focus error signal FE varies depending on reflectance. Thus, if the substrate thickness deviates significantly from the predetermined reference thickness, the variation in reflectance cannot be eliminated by normalization based on the amplitude of the focus error signal FE as in the prior art. Thus, normalization based on the focus sum signal FS, indicating the reflectance itself, allows determination to be accurately achieved even if the substrate thickness deviates significantly from the predetermined reference thickness, disrupting the relationship between the amplitude of the focus error signal FE and the focus sum signal FS.

Figures 4A, 4B:
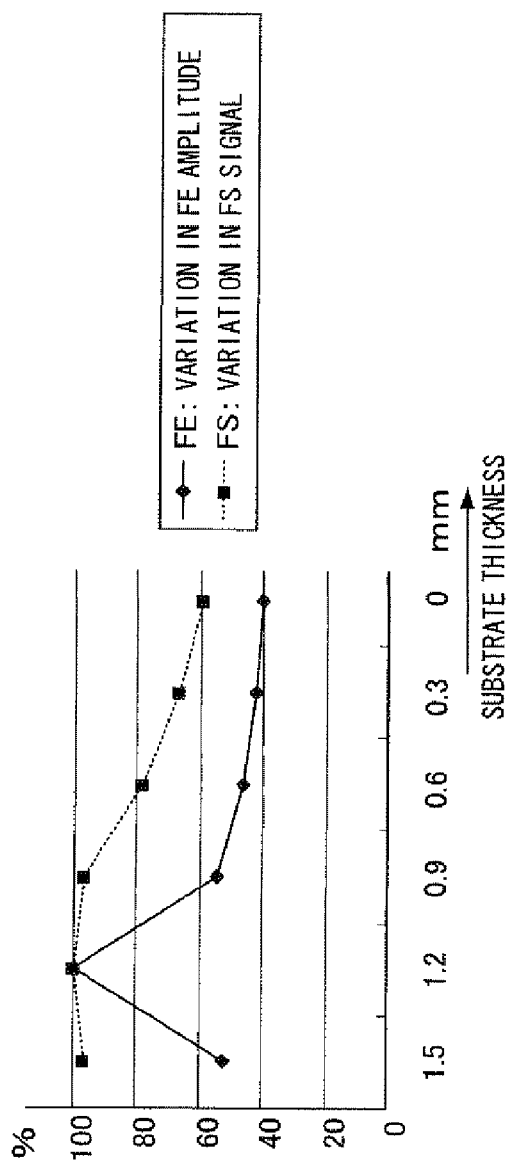
FIG. 4 is a diagram illustrating Formula 3 in accordance with Embodiment 1 and a diagram showing comparison between an FE balance value for each substrate thickness obtained by processing based on Formula 1 and an FE balance value for each substrate thickness obtained by processing based on Formula 3.

FIG. 4(a) shows a variation in FE amplitude and in FS amplitude observed when the substrate thickness is varied with the reference substrate thickness set at 1.2 mm, corresponding to a value "100".

As shown in FIG. 4(a), if the deviation of the substrate thickness from the predetermined reference thickness has at least a given value, the focus sum signal FS varies more significantly than the amplitude of the focus error signal FE. FIG. 4(b) shows comparison between the balance value of the focus error signal FE based on Formula 3 and the conventional balance value of the focus error signal FE based on Formula 2 for a CD of a substrate thickness of 1.2 mm, a DVD of a substrate thickness of 0.6 mm, and the like; the values were obtained when the discs were accessed using a CD recording and reproducing laser, FIG. 4(b) indicates that even with a significant variation in substrate thickness, the resulting great variation in balance value allows determination to be achieved more accurately than in the prior art.

Figure 5A:
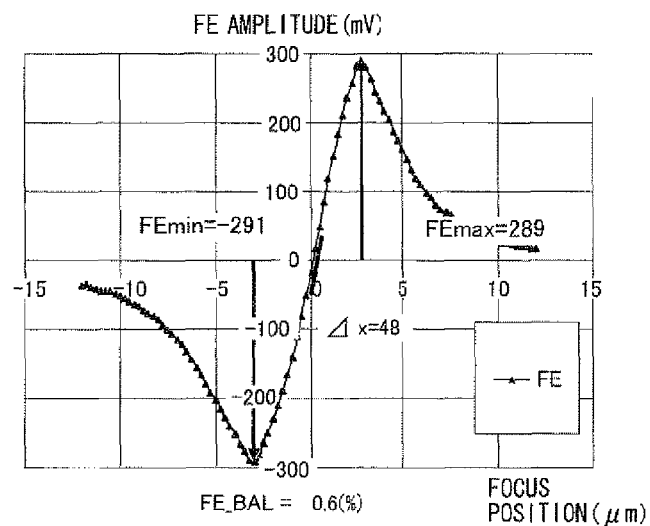
FIG. 5 is a diagram showing comparison between a variation in focus error signal FE for a substrate thickness of 1.2 mm, and a variation in focus error signal FE for a substrate thickness of 0.9 mm and a diagram showing a variation in RF amplitude depending on a focus position.

FIG. 5(a) shows a variation in focus error signal FE near a focusing point observed when a CD semiconductor laser is illuminated and moved at a fixed speed by an actuator, for a CD-ROM of a substrate thickness of 1.2 mm and a non-DVD surface of a dual disk of a substrate thickness of 0.9 mm. As shown in FIG. 5(a), with the reduced substrate thickness, spherical aberration may cause defocusing and reduce the amplitude of the focus error signal FE, As a result, the inclination of the focus error signal FE decreases at a 0 cross point of the focus error signal FE.

Figure 5B:
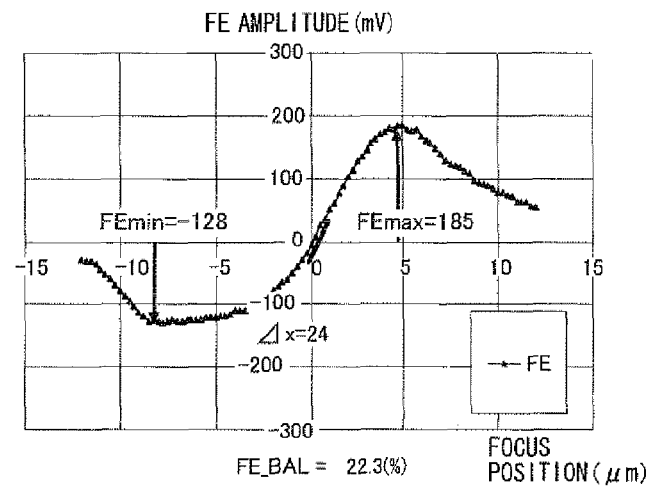

FIG. 5(b) shows the relationship between the RF amplitude and the focus position, which is the offset of the focus error signal FE, for a CD-ROM of a substrate thickness of 1.2 mm and a non-DVD surface of a dual disk of a substrate thickness of 0.9 mm; the relationship was observed when the CD semiconductor laser was illuminated to make the disc accessible. As shown in FIG. 5(b), spherical aberration may cause defocusing to separate the point with a focus error signal of "0" from the point with the maximum RF amplitude. This in turn separates the focus position with the maximum FF amplitude for the CD-ROM from the focus position with the maximum RF amplitude for the non-DVD surface of the dual disc.

Embodiment 2

Figure 6:
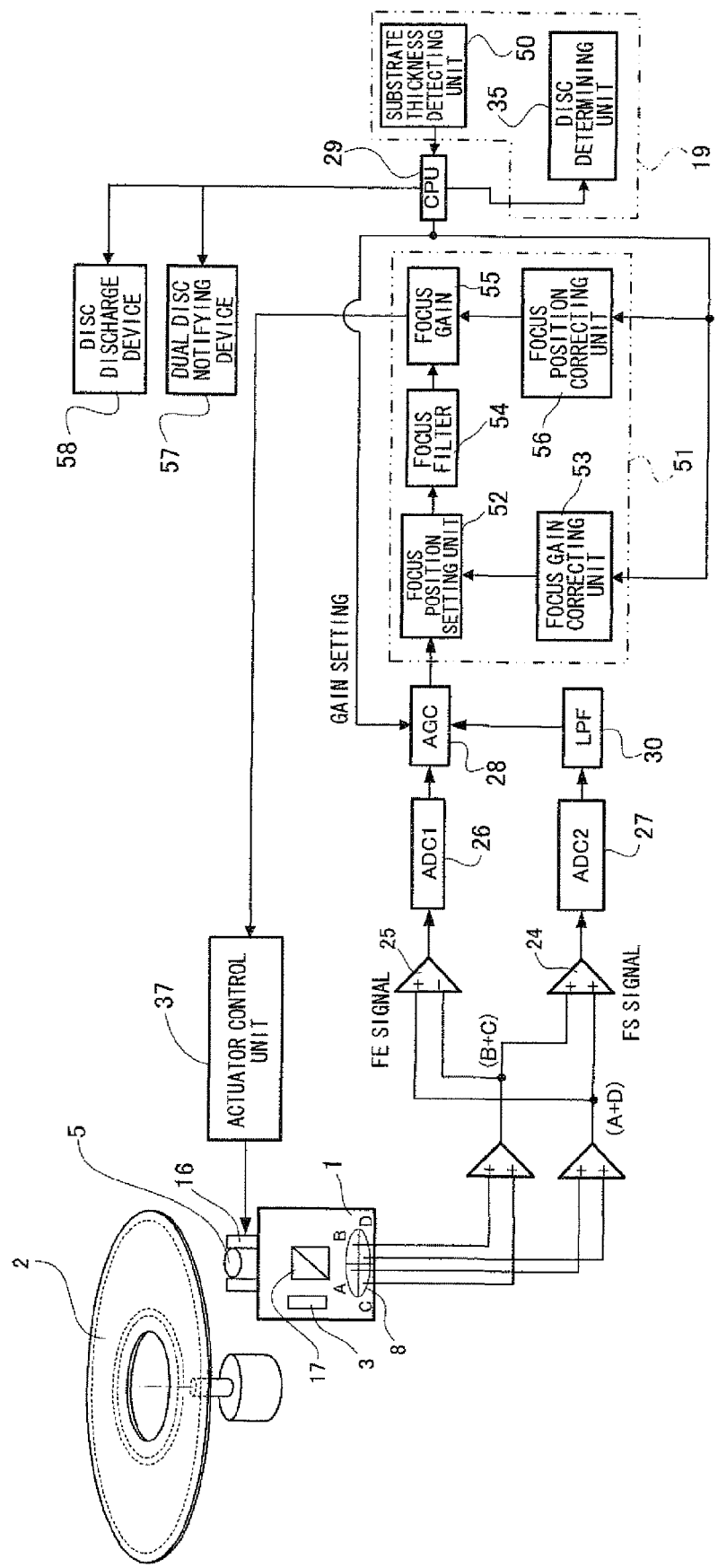
FIG. 6 is a diagram of the configuration of an optical disk apparatus in accordance with (Embodiment 2) of the present invention.
Figure 7:
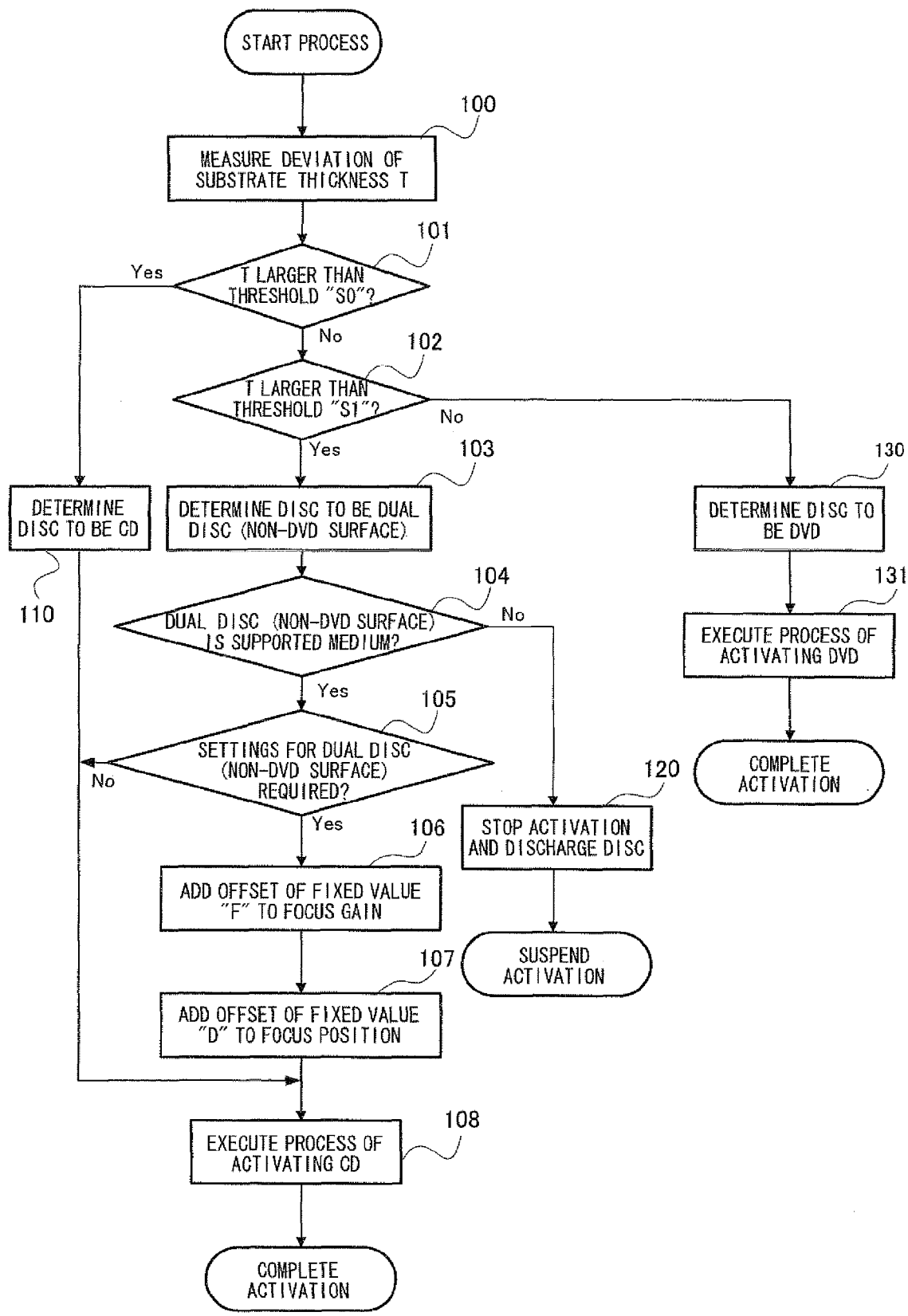
FIG. 7 is a flowchart of Embodiment 2.

FIGS. 6 and 7 show (Embodiment 2) of the present invention.

FIG. 6 shows the configuration of that part of an optical disc apparatus capable of recording or reproduction of different types of discs which relates to focus servo control for obtaining reproduction signals.

The optical pickup 1 that emits laser light to the disc 2 has the objective lens 5, the light source 3 that emits the laser light, an actuator 16 that moves the objective lens 5 in the focus direction, and the focus detecting light receiving unit 8 for detecting the focus state on the basis of reflected light from the disc 2. Reference numeral 17 denotes the dichroic prism that reflects the laser light emitted by the light source 3 toward the objective lens 5 so that the light reflected by the disc 2 falls on the dichroic prism 17 via the objective lens 5 and passes through the dichroic prism 17 toward the focus detecting light receiving unit 8.

Specifically, the photodetector 20 divided into the four light receiving areas a, b, c, d as shown in FIG. 2 is used as the focus detecting light receiving unit 8. Reference numeral 21 denotes the reflected light obtained when no focus error is present. The four-divided photodetector 20 is similar to that shown in FIG. 17 of Japanese Patent Laid-Open No. 2002-245639.

The detection signals A, D from the light receiving areas a, d are added together by the calculator 22 to obtain (A+D). The detection signals B, C from the light receiving areas b, c are added together by the calculator 23 to obtain (B+C). The output from the calculator 22, (A+D), and the output from the calculator 23, (B+C), are added together by the calculator 24 to obtain the focus sum signal FS, ((A+D)+(B+C)). The focus sum signal FS is a full addition signals and thus has a value increasing and decreasing consistently with the reflectance of the disc. Further, the calculator 25 subtracts the output (B+C) from the calculator 23 from the output (A+D) from the calculator 22 to obtain the focus error signal FE, (A+D)−(B+C)). With a fixed substrate thickness, the focus error signal FE has a value increasing and decreasing consistently with the reflectance of the disc.

The focus error signal FE is converted into a digital signal via the analog/digital converter 26. The focus sum signal FS is converted into a digital signal via the analog/digital converter 27.

The output from the analog/digital converter 26 is input to a focus servo loop 51 via the automatic gain control amplifier 28 that amplifies an input signal level to a target level. The gain of the automatic gain control amplifier 28 is set by the reference value "K" supplied by the computer 29 described below such that the maximum value of the output level reaches the target level when the automatic gain control amplifier 28 amplifies the focus sum signal FS. The focus sum signal FS is supplied to the input of the automatic gain control amplifier 28 via the low pass filter 30.

The focus servo loop 51 negatively feeds back the focus error signal FE and operates an actuator control device 37 with the target value for the focus error signal FE set at "0" at the focusing point.

In the focus servo loop 51, the focus error signal FE is Input to a focus position setting unit 52, which applies an offset to the focus error signal FE. With the focus servo loop, although setting the value of the focus error signal FE to "0" stabilizes focus servo, the quality of reproduction signals from the disc may be better when the focus error signal FE is offset from the "0" position. In this case, a value other than "0" is set for the focus position setting unit 52 so that the offset position corresponds to the target value for focus servo.

A signal output by the focus position setting unit 52 is subjected to gain distribution among appropriate bands such as a low frequency band and a high frequency band by a focus filter 54. Final gain adjustment is performed by a focus gain 55.

The actuator control unit 37 controls the actuator 16 on the basis of a signal output by the focus servo loop 51.

FIG. 7 shows items carried out by the computer 29 during activation after determining the type of the disc.

In step 100, a substrate thickness detecting unit 50 measures the substrate thickness T. Either the method shown in FIG. 3 (Embodiment 1) or another method may be used to measure the substrate thickness T.

In step 101, a disc determining unit 35 for detecting a dual disc having a non-DVD surface is used to compare the substrate thickness T acquired in step 100 with the preset threshold "S0". If the substrate thickness T is smaller than the threshold "S0", the process shifts to step 102. If the substrate thickness T is greater than the threshold "S0", then in step 110, the apparatus determines the disc to be a CD. The process then shifts to step 108.

In step 102, the disc determining unit 35 is used to compare the substrate thickness T acquired in step 100 with the preset threshold "S1". If the substrate thickness T is greater than the threshold "S1", then in step 103, the apparatus determines the disc to have a non-DVD surface of a dual disc. Then, a dual disc notifying device 57 as a disc type notifying unit notifies an external apparatus connected to the optical disc apparatus that the non-DVD surface of the dual disc has been detected. If the substrate thickness T is smaller than the threshold "S1", then in step 130, the apparatus determines the disc to be a DVD. In step 131, the apparatus executes a process of activating the DVD. The activation is thus completed.

In step 104, the apparatus determines whether or not the non-DVD surface of the dual disc belongs to a support medium. If the non-DVD surface of the dual disc belongs to a support medium, the process shifts to step 105. Otherwise, in step 120, the apparatus determines that the disc cannot be activated and stops the activating process. A disc discharging device 58 then discharges the disc, and the activating process is suspended.

In step 105, the apparatus determines whether or not settings need to be made for the non-DVD surface of the dual disc. If settings need to be made for the non-DVD surface of the dual disc, then in step 106, a focus gain correcting unit 56 is used to offset the value of focus gain by "F". If the substrate thickness T is greater than the predetermined reference thickness as in the case of the non-DVD surface of the dual disk, the S shape of the focus error signal FE has a smaller inclination as shown in FIG. 5(a). Thus, even when the actuator is moved by the same amount, the focus error signal FE varies by a reduced amount, reducing the gain. This results in the lack of the gain, which, in the worst case, prevents the side-runout of the disc from being followed. Consequently, the focus position may not be retracted. Thus, to allow the focus position to be easily retracted, the gain is increased by a predetermined value required to correct the difference in inclination between the focus error signal FE for the CD-ROM and the focus error signal FE for the non-DVD surface of the dual disc. Alternatively, although the above method corrects the gain set for the CD-ROM by the amount corresponding to the decrease in the inclination of the S shape of the focus error signal FE, a gain value may be set which facilitates the retraction of the focus position which is exclusively predetermined for the non-DVD surface of the dual disc.

In step 107, a focus position correcting unit 53 is used to apply an offset to the focus position. If the substrate thickness T is greater than the predetermined reference thickness as in the case of the non-DVD surface of the dual disc, the focus position with the maximum RF amplitude, which exhibits high disc reading performance, is located farther than the focus position for the normal CD-RON as shown in FIG. 5(b). Thus, the setting of the focus position for the CD-ROM may prevent a disc reading operation from being achieved. Even if the position with the maximum RF amplitude is learned, the learning operation requires a long time because the focus position with the maximum RF amplitude, which exhibits high disc reading performance, is located far. Thus, a disc reading operation can be quickly and accurately performed by setting, for a dedicated use for a non-DVD side of the dual disk, a value for the focus position which is offset from the focus position set for the CD-ROM by a value "D" required to correct the difference from the maximum RF amplitude. Alternatively, although the above method corrects the difference of the position with the maximum RF amplitude for the non-DVD surface of the dual disk from the focus position set for the CD-ROM, a value for the focus position with the maximum RF amplitude may be exclusively set for the non-DVD surface of the dual disc. Other adjustments or corrections may be exclusively made for the non-DVD surface of the dual disk in order to improve disk reading performance or servo stability. In step 108, the apparatus executes a process of activating the CD. The activation is thus completed.

The above embodiments have been described taking the case where the non-DVD surface of the dual disk is determined. However, the present invention can be similarly used for a disc having a DVD laminated on one surface and a non-DVD having a different disk thickness than that of CD laminated on the opposite surface, to determine the non-DVD surface.

The above embodiments have been described taking the case of the dual disc, which is a laminated disc. However, the present invention may be configured so that if a disc such as a CD or a DVD which is different from the laminated disc and which has a substrate thickness deviating from a relevant standard tolerance is set in the apparatus, the apparatus can determine the type of the disc, that is, whether or not the disc conforms to the standards, and if the disc is determined not to conform the standards, the apparatus discharges the set disc or performs recording/reproduction with the focus adjusted.

INDUSTRIAL APPLICATION

The optical disc apparatus and the optical disc determining method in accordance with the present invention contribute to improving the operability of the optical disc apparatus by allowing the type of a set disc to be determined more accurately than in the prior art to automatically switch the laser wavelength used for recording/reproduction.

The optical disc apparatus and the optical disc determining method in accordance with the present invention allow the non-DVD surface of the dual disc to be accurately distinguished from the other discs. If the disc is determined to have the non-DVD surface of the dual disc, the focus gain or the focus position is corrected to improve the reading performance and servo stability. This makes it possible to stabilize the operation of activating the non-DVD surface of the dual disc as well as reading operations.

FIG. 1
37 ACTUATOR CONTROL DEVICE
36 FOCUS SEARCH UNIT
31 FIRST MEASURING UNIT
32 SECOND MEASURING UNIT
33 BALANCE GENERATING UNIT
34 BALANCE COMPARING UNIT
35 DISC DETERMINING UNIT
1 FOCUS ERROR SIGNAL
2 MAXIMUM VALUE
3 MINIMUM VALUE

FIG. 3
1 START PROCESS
100 TURN ON LASER
101 INPUT ANY VALUE K TO AUTOMATIC GAIN CONTROL AMPLIFIER (AGC) 28 (OUTPUT FROM AGC IS K/FS)
102 START FOCUS SEARCH
103 FE AMPLITUDE EQUAL TO OR GREATER THAN "P"?
110 MEASURE FEMAX
111 MEASURE FEMIN
112 S-SHAPE DETECTING COUNTER G "+1"
113 MEASURE FEMAX
104 INCREASE OR REDUCE FOCUS SEARCH AMOUNT BY ONE STEP
105 FOCUS SEARCH COMPLETED?
120 S-SHAPE DETECTING COUNTER G SHOWING "0"?
2 DETERMINE THAT NO DISC IS PRESENT
121 S-SHAPE DETECTING COUNTER G SHOWING AT LEAST "2"?
122 S-SHAPE DETECTING COUNTER G SHOWING AT LEAST "3"?
3 ABORT
4 DETERMINE DISC TO BE DVD (TWO LAYERS)
123 DETERMINE SUBSTRATE THICKNESS T
124 T GREATER THAN THRESHOLD "S0"?
5 DETERMINE DISC TO BE CD
125 T GREATER THAN THRESHOLD "S1"?
6 DETERMINE DISC TO BE DUAL DISC (NON-DVD SURFACE)
7 DETERMINE DISC TO BE DVD (ONE LAYER)

FIG. 4(a)
1 VARIATION IN FE AMPLITUDE
2 VARIATION IN FS SIGNAL
3 SUBSTRATE THICKNESS

FIG. 4(b)
1 SUBSTRATE THICKNESS
2 FE BALANCE VALUE BASED ON FORMULA 3
3 FE BALANCE VALUE BASED ON FORMULA 1 (PRIOR ART)

FIG. 5(a)
1 FE AMPLITUDE
2 FOCUS POSITION

FIG. 5(b)
1 FE AMPLITUDE
2 FOCUS POSITION

Figure 5C:
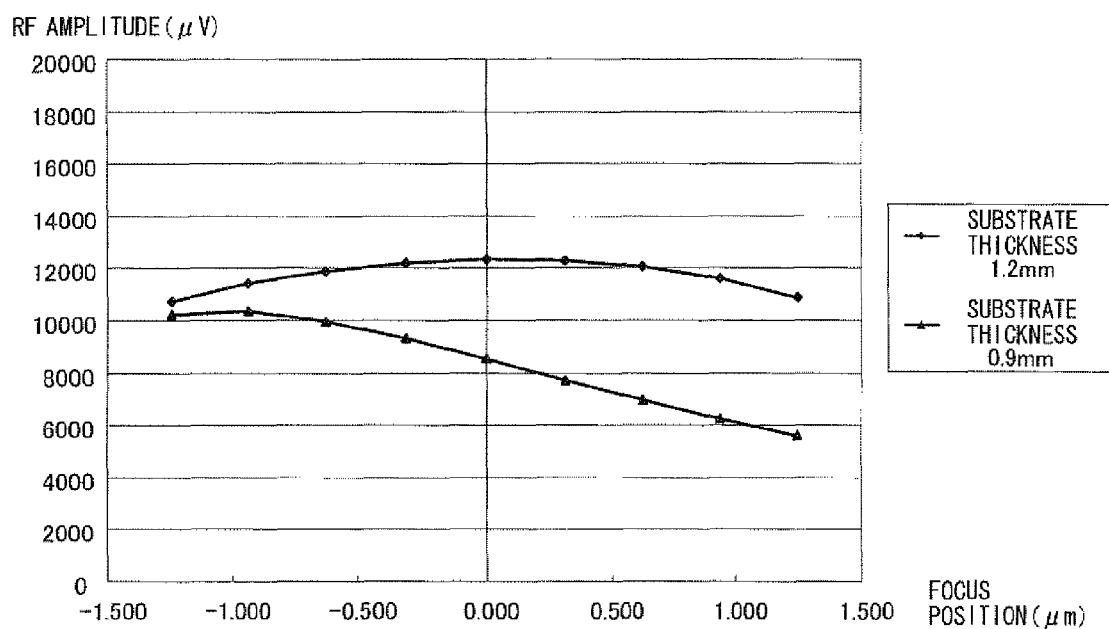

FIG. 5(c)
1 RF AMPLITUDE
2 SUBSTRATE THICKNESS
3 FOCUS POSITION

FIG. 6
37 ACTUATOR CONTROL UNIT
58 DISC DISCHARGE DEVICE
57 DUAL DISC NOTIFYING DEVICE
52 FOCUS POSITION SETTING UNIT
54 FOCUS FILTER
55 FOCUS GAIN
53 FOCUS GAIN CORRECTING UNIT
56 FOCUS POSITION CORRECTING UNIT
50 SUBSTRATE THICKNESS DETECTING UNIT
35 DISC DETERMINING UNIT
1 FE SIGNAL
2 FS SIGNAL
3 GAIN SETTING

FIG. 7
1 START PROCESS
100 MEASURE SUBSTRATE THICKNESS T
101 T LARGER THAN THRESHOLD "S0"?

102 T LARGER THAN THRESHOLD "S1"?
110 DETERMINE DISC TO BE CD
103 DETERMINE DISC TO BE DUAL DISC (NON-DVD SURFACE)
104 DUAL DISC (NON-DVD SURFACE) IS SUPPORTED MEDIUM?
105 SETTINGS FOR DUAL DISC (NON-DVD SURFACE) REQUIRED?
106 ADD OFFSET OF FIXED VALUE "F" TO FOCUS GAIN
107 ADD OFFSET OF FIXED VALUE "D" TO FOCUS POSITION
108 EXECUTE PROCESS OF ACTIVATING CD
2 COMPLETE ACTIVATION
120 STOP ACTIVATION AND DISCHARGE DISC
3 SUSPEND ACTIVATION
130 DETERMINE DISC TO BE DVD
131 EXECUTE PROCESS OF ACTIVATING DVD

Figure 8:
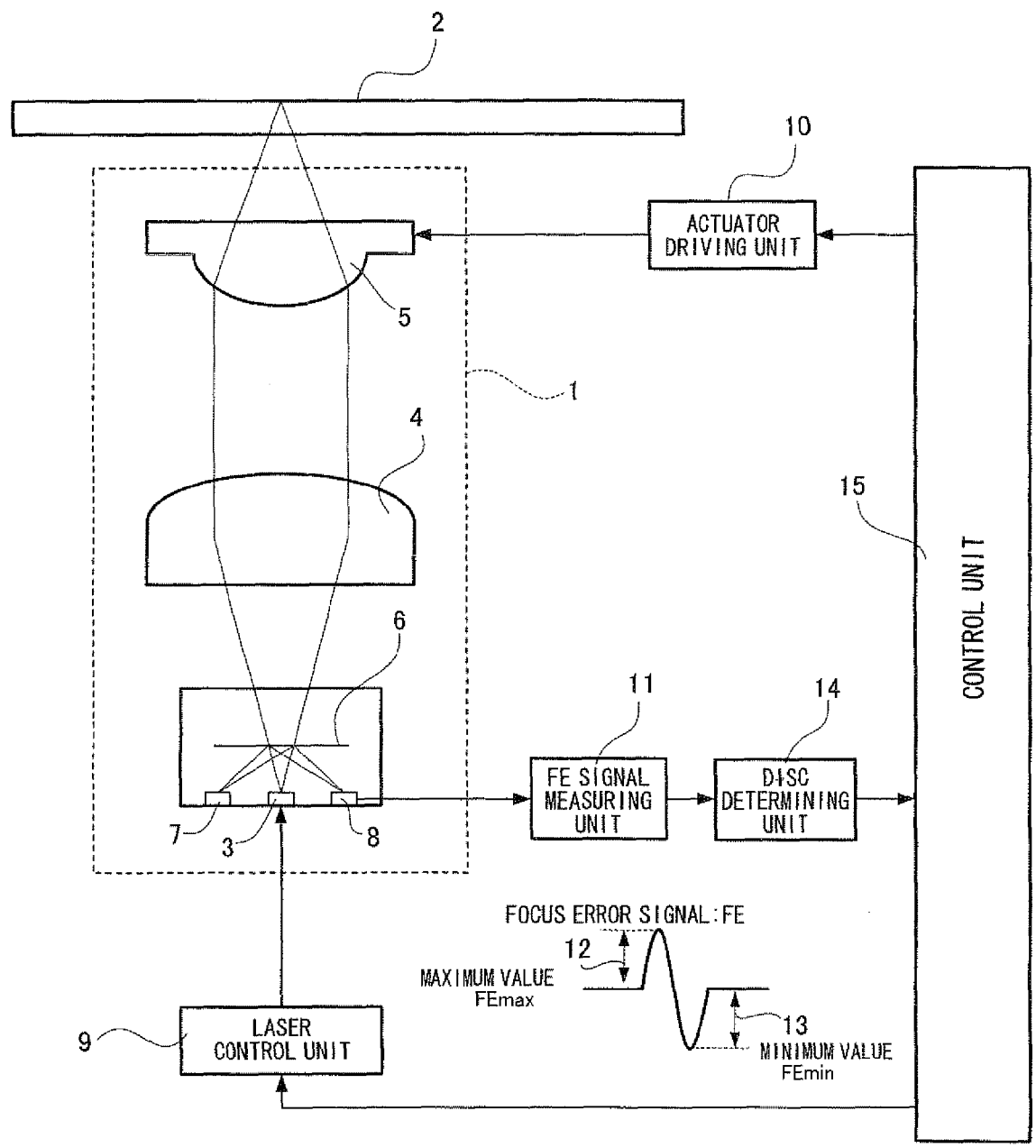
FIG. 8 is a diagram of the configuration of a conventional optical disk apparatus.

FIG. 8
10 ACTUATOR DRIVING UNIT
11 FE SIGNAL MEASURING UNIT
14 DISC DETERMINING UNIT
9 LASER CONTROL UNIT
1 FOCUS ERROR SIGNAL
12 MAXIMUM VALUE
13 MINIMUM VALUE
15 CONTROL UNIT

Figure 9:
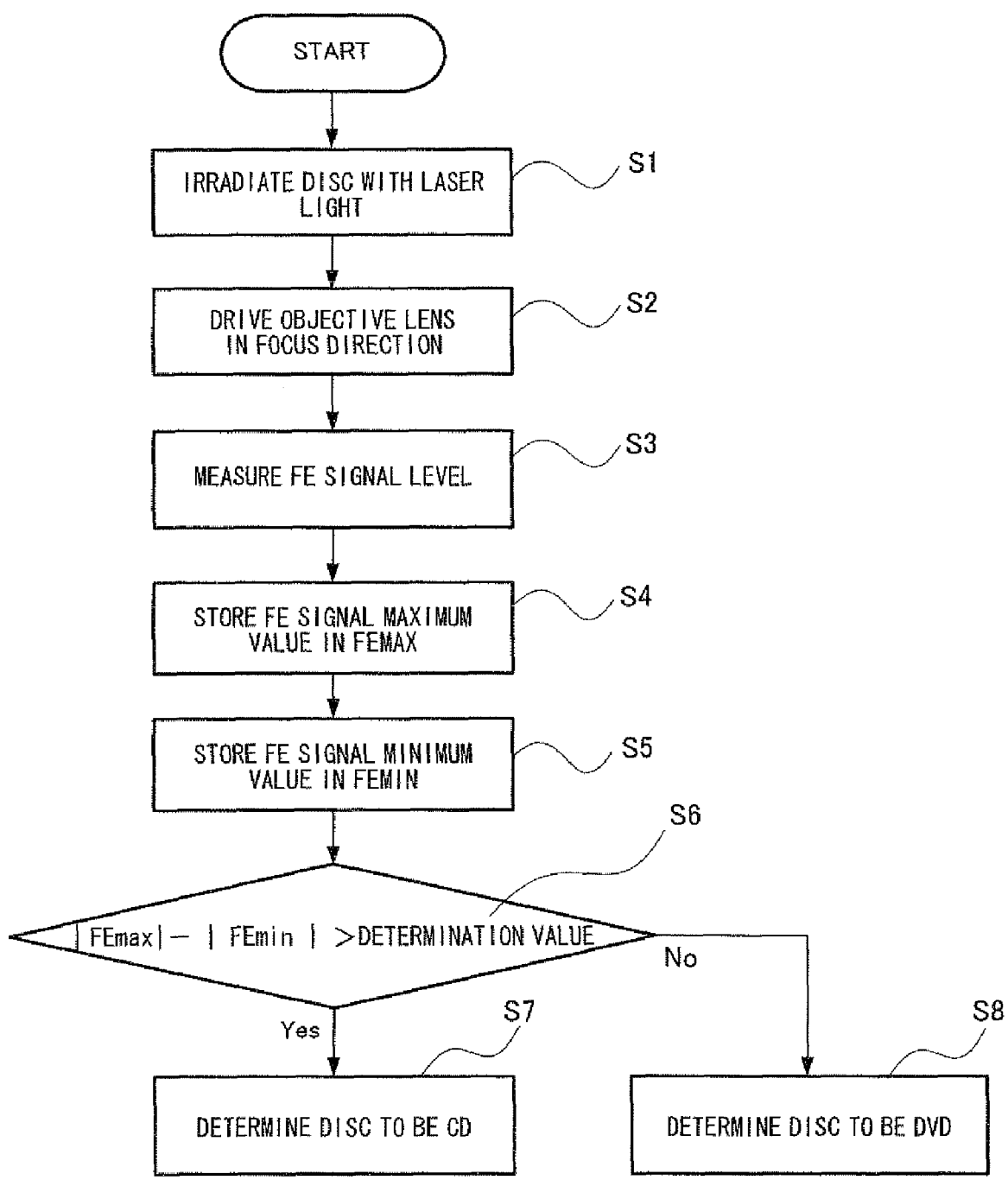
FIG. 9 is a flowchart for the conventional optical disk apparatus.

FIG. 9
S1 IRRADIATE DISC WITH LASER LIGHT
S2 DRIVE OBJECTIVE LENS IN FOCUS DIRECTION
S3 MEASURE FE SIGNAL LEVEL
S4 STORE FE SIGNAL MAXIMUM VALUE IN FEMAX
S5 STORE FE SIGNAL MINIMUM VALUE IN FEMIN
S6 DETERMINATION VALUE
S7 DETERMINE DISC TO BE CD
S8 DETERMINE DISC TO BE DVD

FIGS. 8 & 9 PRIOR ART

The invention claimed is:

1. An optical disc apparatus configured to perform at least one of recording and reproducing different types of discs, the optical disc apparatus comprising:
an optical pickup for irradiating the disc with laser light via an objective lens;
an actuator for moving the objective lens in a focus direction;
a focus detecting light receiving unit for detecting a focus state on the basis of reflected light from the disc;
an FE signal measuring unit for measuring the amplitude of a focus error signal generated by the focus detecting light receiving unit; and
a disc determining unit for storing a first threshold for determining the substrate thickness of the disc and a second threshold for determining the type of the disc and determining the type of the disc on the basis of the amplitude measured by the FE signal measuring unit,
wherein:
the disc determining unit deter mines the substrate thickness T of the disc on the basis of (FEmax−FEmin)/FSmax, where FEmax is a maximum value of the amplitude of the focus error signal, FEmin is a minimum value of the amplitude of the focus error signal, and FSmax is a maximum value of the amplitude of a focus sum signal,
the disc determining unit determines that the disc is a Compact Disc based on the substrate thickness T being smaller than the first threshold,
the disc determining unit determines that the disc has a non-Digital Versatile Disc surface of a dual disc having a Digital Versatile Disc surface and the non-Digital Versatile Disc surface based on the substrate thickness T being greater than the first threshold and smaller than a second threshold, the first threshold being smaller than the second threshold, and
the disc determining unit determines that the disc is a Digital Versatile Disc having one layer based on the substrate thickness T being greater than the second threshold.

2. An optical disc determining method, comprising:
moving an objective lens while irradiating a disc with laser light to determine the type of the disc;
during the movement of the objective lens with the disc irradiated with the laser light, measuring the amplitude of a focus error signal, a maximum value FEmax of the amplitude of the focus error signal and a minimum value FEmin of the amplitude of the focus error signal, and a maximum value FSmax of the amplitude of a focus sum signal;
determining a substrate thickness T based on (FEmax−FEmin)/FSmax;
determining that the disc is a Compact Disc based on the substrate thickness T being smaller than a first threshold;
determining that the disc has a non-Digital Versatile Disc surface of a dual disc having a Digital Versatile Disc surface and the non-Digital Versatile Disc surface based on the substrate thickness T being greater than the first threshold and smaller than a second threshold, the first threshold being smaller than the second threshold; and
determining that the disc is a Digital Versatile Disc having one layer based on the substrate thickness T being greater than the second threshold.

* * * * *